US012648672B2

(12) United States Patent
Gazdick, III et al.

(10) Patent No.: US 12,648,672 B2
(45) Date of Patent: Jun. 9, 2026

(54) GRIDDLE FOR BARBECUE GRILL OR SMOKER

(71) Applicant: Premier Specialty Brands LLC, Chamblee, GA (US)

(72) Inventors: Donald Stephen Gazdick, III, Suwanee, GA (US); Joseph Pruitt, Athens, GA (US)

(73) Assignee: Premier Specialty Brands LLC, Chamblee, GA (US)

( * ) Notice: Subject to any disclaimer, the term of this patent is extended or adjusted under 35 U.S.C. 154(b) by 232 days.

(21) Appl. No.: 18/122,421

(22) Filed: Mar. 16, 2023

(65) Prior Publication Data

US 2023/0292956 A1 Sep. 21, 2023

Related U.S. Application Data

(60) Provisional application No. 63/321,490, filed on Mar. 18, 2022.

(51) Int. Cl.
*A47J 37/07* (2006.01)
*A21B 1/00* (2006.01)
(Continued)

(52) U.S. Cl.
CPC ....... *A47J 37/0786* (2013.01); *A47J 37/0704* (2013.01)

(58) Field of Classification Search
CPC .. A47J 37/0786; A47J 37/0704; A47J 37/067; A47J 37/0694; A47J 36/025
(Continued)

(56) References Cited

U.S. PATENT DOCUMENTS 3,130,664 A * 4/1964 Jarmuth .............. A47J 37/0676
219/94
4,648,379 A * 3/1987 Fordyce .............. A47J 37/0694
99/426
(Continued)

FOREIGN PATENT DOCUMENTS

GB 2127280 A * 4/1984 .......... A47J 37/0676
KR 200337318 Y1 * 12/2003 .............. A47J 37/06
(Continued)

OTHER PUBLICATIONS

English translation of KR200337318 by PE2E Mar. 14, 2025.*
(Continued)

*Primary Examiner* — Deming Wan
(74) *Attorney, Agent, or Firm* — Miller & Martin PLLC

(57) ABSTRACT

A griddle adapted for use on a kamado-style grill is disclosed herein. The griddle may comprise a flat cooking surface suitable for cooking, for example, meats, vegetables, and breakfast foods. The griddle may comprise a grease chute that provides a receptacle within or adjacent to the flat cooking surface for removing grease during cooking. The grease chute directs the grease to one or more holes in the grease chute through which the grease can drain into the fuel chamber below the griddle. The griddle may comprise an outer lip that extends upwardly away from the flat cooking surface to prevent grease or food from falling over perimeter edges of the flat cooking surface. Additionally, the griddle may comprise one or more notches for coupling the griddle to a cooking grate and/or other structure, thereby helping to secure the griddle's position on the cooking grate of the kamado-style grill.

7 Claims, 7 Drawing Sheets

(51) Int. Cl.

| | |
|---|---|
| *A47J 36/00* | (2006.01) |
| *B21B 3/00* | (2006.01) |
| *F23D 14/06* | (2006.01) |
| *F23D 14/08* | (2006.01) |

(58) Field of Classification Search
USPC .......................................... 99/425, 444, 422
See application file for complete search history.

(56) References Cited

U.S. PATENT DOCUMENTS

| | | | |
|---|---|---|---|
| 4,930,491 A | 6/1990 | Purello | |
| 5,678,531 A | 10/1997 | Byers et al. | |
| 6,389,961 B1 | 5/2002 | Wu | |
| 6,644,175 B2 | 11/2003 | Stephen et al. | |
| 7,647,866 B2 | 1/2010 | Button | |
| 7,823,577 B1 * | 11/2010 | Babjak ................ A47J 37/0694 | |
| | | | 126/41 R |
| 9,215,949 B1 | 12/2015 | Cloutier et al. | |

| | | | |
|---|---|---|---|
| 12,376,702 B2 | 8/2025 | Pruitt et al. | |
| 2009/0071465 A1 | 3/2009 | Leavens et al. | |
| 2011/0315135 A1 | 12/2011 | Hillard et al. | |
| 2017/0332839 A1 | 11/2017 | Dahle et al. | |
| 2022/0015574 A1 | 1/2022 | McVey et al. | |
| 2022/0071445 A1 | 3/2022 | Springer | |
| 2022/0304507 A1 | 9/2022 | Simon et al. | |
| 2022/0304509 A1 | 9/2022 | Jenison | |

FOREIGN PATENT DOCUMENTS

| | | |
|---|---|---|
| KR | 101 792 922 B1 | 11/2017 |
| WO | 2004/093622 A2 | 11/2004 |

OTHER PUBLICATIONS

English GB 2127280 by PE2E Jun. 28, 2025.*
International Search Report and Written Opinion of the International Searching Authority, dated Jun. 13, 2023, for PCT/US2023/015364.

* cited by examiner

GRIDDLE FOR BARBECUE GRILL OR SMOKER

CROSS REFERENCE TO RELATED APPLICATION

The present application claims the benefit of priority under 35 U.S.C. § 119(e) to U.S. Provisional Application No. 63/321,490, entitled "Griddle for Kamado-Style Grill," filed Mar. 18, 2022, which is hereby incorporated by reference in its entirety as if fully set forth herein.

FIELD OF THE INVENTION

The present invention generally relates to griddles, and more particularly, to a novel griddle design that may be used on a barbecue grill or smoker, including but not limited to a kamado-style grill.

BACKGROUND OF THE INVENTION

"Kamado" is the Japanese term for a traditional cooking stove fueled by wood or charcoal. In its more modern sense, the term kamado has come to denote a wood-fired and/or charcoal-fired cooking vessel typically made from ceramic, clay, terracotta, cement, or crushed lava rock to create a grill that can withstand temperatures in excess of 750 degrees Fahrenheit without cracking from extreme heat or temperature fluctuations. Modern kamados, referred to herein as "kamado-style" grills, may be formed from any suitable metals and/or refractory materials, including but not limited to the materials above alone or in combination with other materials, such as metals and metal alloys. For example, the refractory materials in kamado-style grills may include advanced or engineered ceramics, such as composite and/or reinforced ceramics. The refractory materials may be used to form an enclosed cooking chamber that is resistant to decomposition by heat and that retains its shape when the kamado-style grill is in use.

Because kamado-style grills are highly efficient at retaining heat, they can be used to maintain consistent cooking temperatures over a large temperature range, such as between 225 and 750 degrees Fahrenheit. As a result, a kamado-style grill provides a versatile cooking apparatus that can be used for grilling, smoking, stewing, roasting, and baking many different kinds of foods. Further, because a kamado-style grill may be used as a grill or a smoker, it may be interchangeably referred to herein as a "kamado-style grill," "kamado-style smoker," "kamado-style grill and smoker," "kamado-style cooker," etc.

A kamado-style grill may comprise an egg-shaped body ("base") with a domed top cover. Kamado-style grills usually have a hinged top because the domed top cover can be very heavy and difficult to handle if it were not attached to the body of the grill. The cooking chamber of the kamado-style grill, i.e., the enclosed portion containing the heating fuel and the cooking surface, is typically ovoid in shape with circular or oval horizontal cross-sections, though square, rectangular, and other horizontal cross-sectional areas are also possible. The cooking chamber of a kamado-style grill is usually heated by a combustible fuel, such as charcoal or wood, placed in the bottom of the chamber formed within the grill base.

Food to be cooked or smoked in the kamado-style grill is typically placed directly on a cooking grate (i.e., a cooking rack) positioned above the fuel source. Some foods, however, cannot be cooked directly on a cooking grate. In cases where a flat cooking surface is desired, such as for cooking certain meats or vegetables, a steel or cast-iron pan may be placed on the cooking grate. While using a pan in this manner can increase the variety of foods that may be cooked in the kamado-style grill, it is still often limiting compared to the types of foods that can be cooked in an indoor kitchen.

Professional indoor kitchens may include a griddle, which is a generally flat cooking surface, often made of metal and heated from below using natural gas or electricity. Cooks at a diner, for example, may use a griddle to prepare eggs, potatoes, pancakes, bacon, burgers, and so forth. Because the cooking surface is generally flat, a user may use spatulas and other utensils for combining and mixing ingredients in ways that cannot easily be done when cooking using outdoor grills or even using cooking pots within outdoor grills. Cleanup can be relatively easy using a griddle, as the user can use a scraper tool to push grease, liquids, and debris over an outer edge of the cooking surface for later collection and disposal.

While griddles for outdoor cooking have been constructed to cover or replace the cooking grate of a grill, there is a need in the art for an improved griddle that would allow users to increase the types and varieties of foods that can be cooked using a barbecue grill or smoker, including a kamado-style grill.

SUMMARY OF THE INVENTION

The disclosed embodiments of the present invention comprise a griddle adapted for use on a kamado-style grill. The griddle may be a removable accessory that can be used when desired on the kamado-style grill to allow for cooking on a substantially flat top surface which may be suitable for cooking, for instance, breakfast foods. Advantageously, the griddle does not require any modifications to existing kamado-style grills, which may include any kamado grill, whether composed of ceramic and/or metal (e.g., steel). In alternative embodiments of the invention, the griddle may be adapted for use with a kettle grill or other type of charcoal grill.

According to the disclosed embodiments, the griddle may comprise a flat cooking surface. As used herein, the "flat" cooking surface is a substantially level and smooth surface that is suitable for supporting food items to be cooked on a griddle. In some disclosed embodiments, the griddle may be a generally circular shape to complement a similar cross-sectional shape of the kamado-style grill and/or its cooking grate. More generally, the griddle may be other shapes as desired to accommodate the shape of the kamado-style grill and/or cooking grate. In some embodiments, the griddle may be sized and shaped to fit snuggly within the kamado-style grill and rest atop the cooking grate.

In accordance with certain embodiments, the griddle may comprise an outer lip that extends upwardly away from the flat cooking surface. The outer lip may provide a barrier to prevent grease or food from falling over outer boundaries of the flat cooking surface or allow for scooping food up against the sides of the griddle during cooking or serving. To that end, the outer lip preferably extends substantially perpendicularly relative to the flat cooking surface. In some disclosed embodiments, the outer lip may extend around the entire perimeter of the griddle; in other embodiments, the outer lip may extend around the flat cooking surface or only a portion thereof. Further, in some embodiments, the vertical height of the outer lip may be approximately the same around the periphery of the griddle. In alternative embodiments, the vertical height of the outer lip may vary around the griddle, for example, having a relatively greater height around certain boundaries of the flat cooking surface.

The griddle in the disclosed embodiments may comprise a grease chute for removing grease during cooking. The grease chute may be configured as a receptacle within or adjacent to the flat cooking surface. In some disclosed embodiments, the grease chute is positioned between the outer lip and the flat cooking surface of the griddle. The grease chute comprises one or more holes and one or more sloped walls configured to guide grease into the one or more holes so the grease can be drained into the fuel chamber below the griddle.

In some disclosed embodiments, the griddle may comprise one or more notches for coupling the griddle to a cooking grate disposed below the griddle. The cooking grate may comprise a set of metal bars arranged in parallel and/or in a grid pattern. Each notch on the griddle may be sized and spaced to fit over one or more bars of the cooking grate. In other embodiments, at least one notch of the griddle may be sized and shaped to engage with a matching structural element on the cooking grate and/or kamado-style grill to help secure the griddle when it is placed over the cooking grate. In some embodiments, the one or more notches may be disposed within a bottom side of the outer lip. In other embodiments, the notches may extend along at least a portion of a bottom surface of the griddle and/or outer lip.

The griddle may comprise one or more handles for positioning and removing the griddle on the kamado-style grill. In some embodiments, the handles may comprise a metal material and may extend upwardly away from the flat cooking surface. In some embodiments, the handles may comprise, or may be coated or covered with, a heat-resistant material, such as a silicone-based material, to facilitate handling by a user. Further, the handles may have various shapes, such as semicircular or L-shaped handles, that can be easily grasped by a user.

The griddle in the disclosed embodiments may be composed of any suitable material or materials. In some embodiments, the griddle may be composed of carbon steel. In other embodiments, different materials may be used to form any one or more of the flat cooking surface, grease chute, outer lip, and/or handles on the griddle.

The present disclosure is merely exemplary of certain embodiments of the present invention. Further objects, features, and advantages will become apparent upon consideration of the following detailed description of the exemplary embodiments when taken in conjunction with the drawings and the appended claims.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples.

DETAILED DESCRIPTION OF THE DISCLOSED EMBODIMENTS

Figure 1:
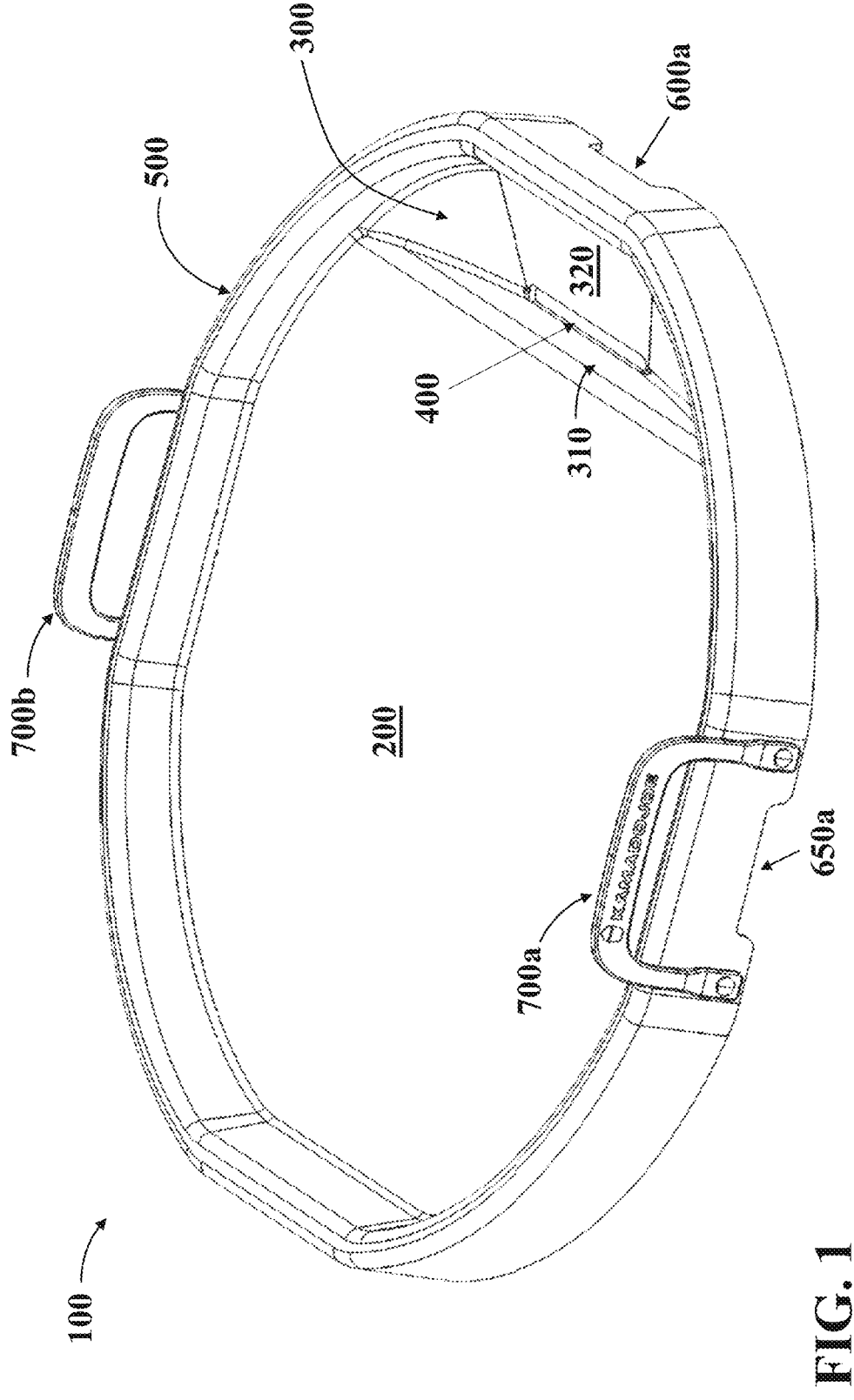
FIG. 1 is a top perspective view of an exemplary griddle that may be used in accordance with certain embodiments of the present invention.

FIG. 1 shows an exemplary griddle 100 that may be used in accordance with certain disclosed embodiments of the invention. The griddle 100 is preferably adapted for use on a kamado-style grill and may be a removable accessory that a user can position over a cooking grate to provide a flat cooking surface, e.g., for cooking meats, vegetables, and breakfast foods. In some embodiments, the griddle 100 may be positioned directly on the cooking grate; in other embodiments, the griddle 100 may be positioned within the grill above the fuel (e.g., wood and/or charcoal) using other means, such as placing the griddle on another accessory or on mounts located within the kamado-style grill.

Figure 4:
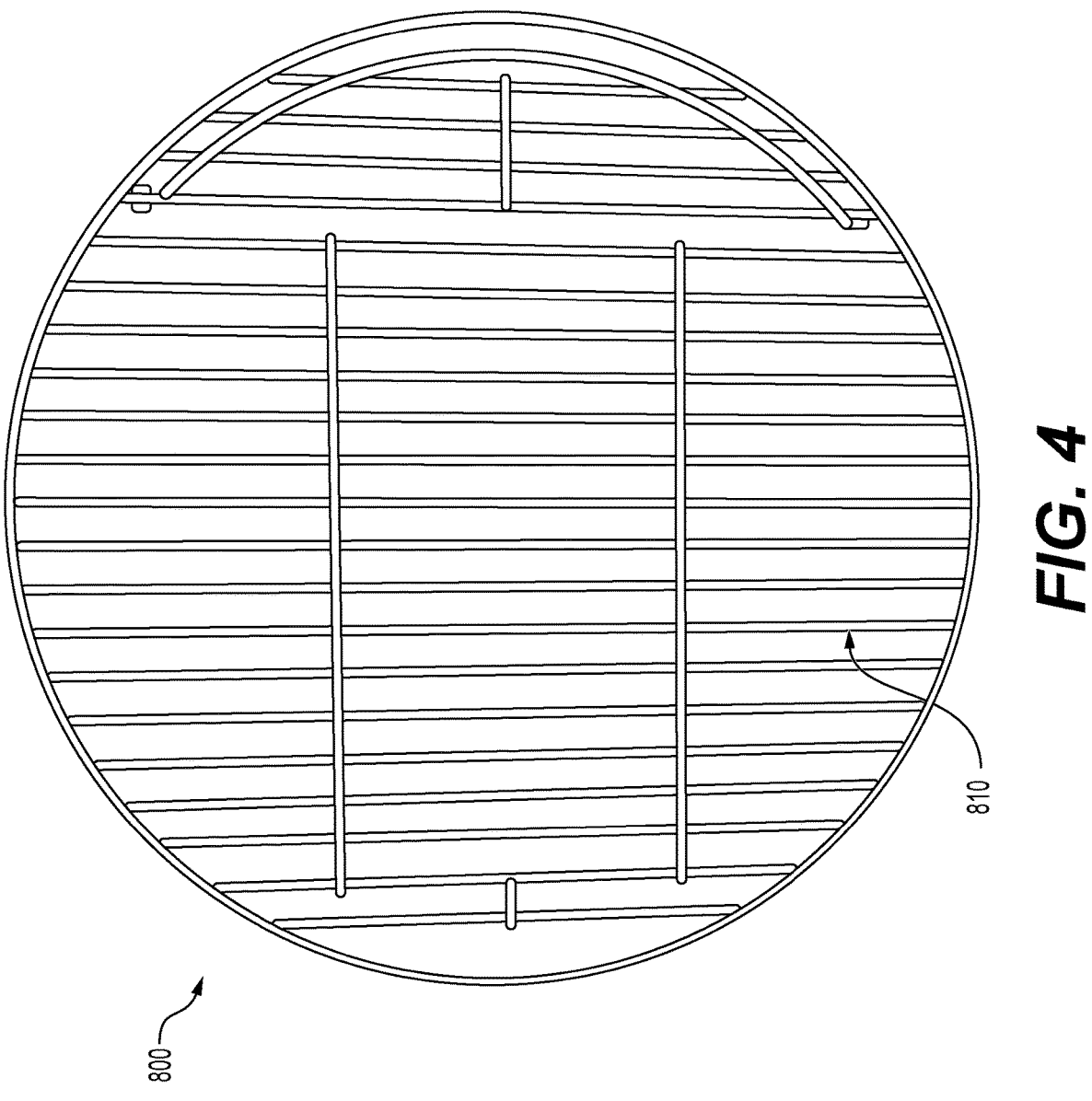
FIG. 4 is top view of an exemplary cooking grate for a kamado-style grill on which the exemplary griddle of FIG. 1 may be positioned in accordance with certain embodiments of the present invention.
Figure 6:
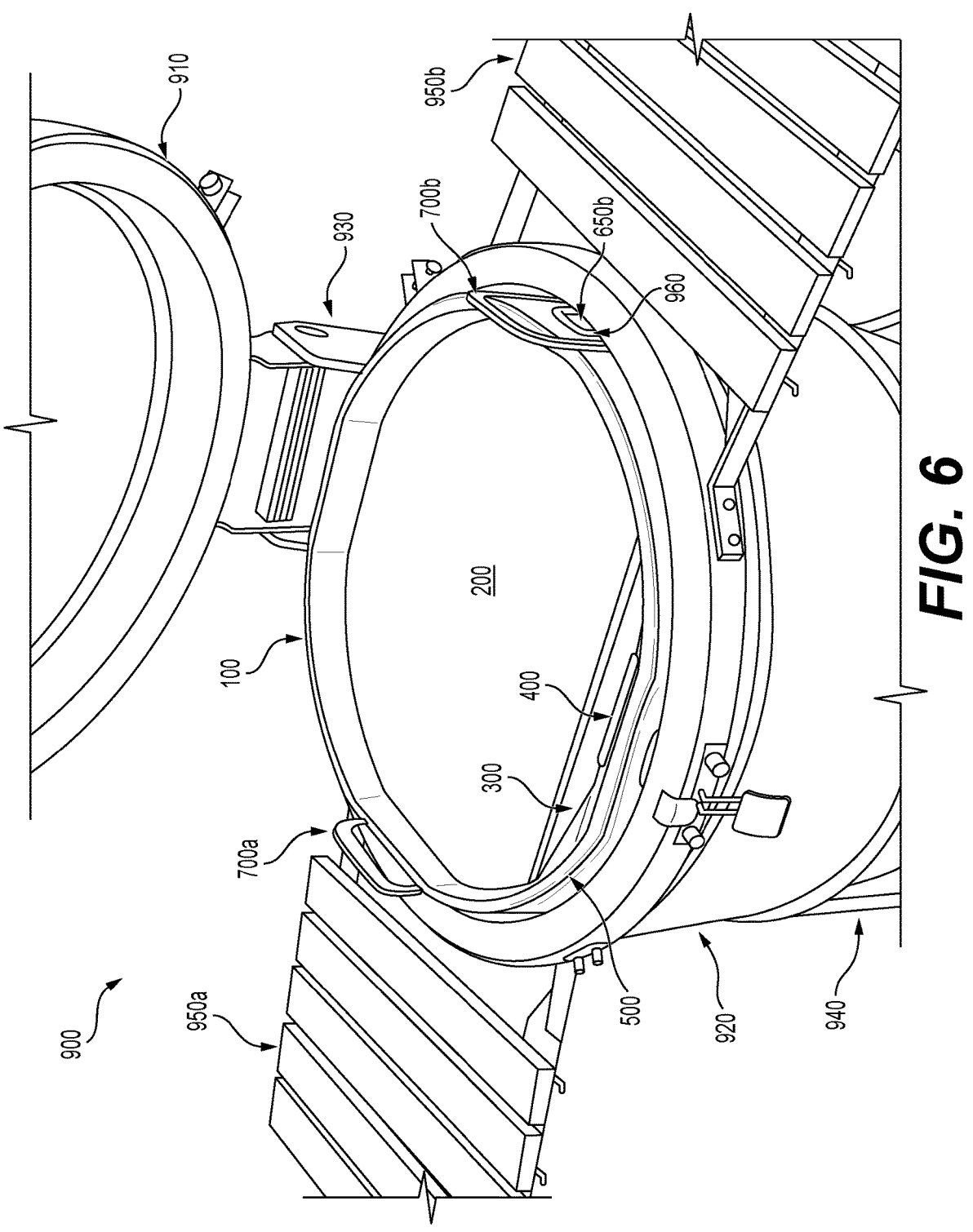
FIG. 6 is a top, front perspective view of the exemplary griddle of FIG. 1 positioned on a cooking grate of an exemplary kamado-style grill having its domed top cover in an open position in accordance with certain embodiments of the present invention.

The exemplary griddle 100 comprises a flat cooking surface 200, a grease chute 300 with at least one hole 400, an outer lip 500, one or more notches 600 and/or 650, and one or more handles 700. In the example of FIG. 1, the griddle 100 may be a substantially circular shape corresponding to a cross-sectional shape of the kamado-style grill and/or its cooking grate (for example as shown in FIGS. 4 and 6). In other embodiments, the griddle 100 may be formed using other shapes to accommodate the shape of a grill and/or cooking grate. The flat cooking surface 200 and grease chute 300 may be formed together as part of an integrated structure in the griddle 100. Further, in some embodiments, the flat cooking surface 200, grease chute 300 (including the at least one hole 400), outer lip 500, and notches 600 and 650 all may be formed together as a single, integrated structure, for example, constructed of the same material.

The griddle 100 in may be composed of any suitable material or materials. For example, in some embodiments, the flat cooking surface 200, grease chute 300, and outer lip 500 may be composed of carbon steel or cast iron. The handles 700 may be formed, coated with, or covered with a different material. In FIG. 1, a user may use handles 700a and 700b to position and remove the griddle 100 on a kamado-style grill. While the exemplary handles 700a and 700b are semicircular shaped, those skilled in the art will appreciate that other handle shapes and configurations are also possible. In some disclosed embodiments, the handles 700a and 700b may comprise a heat-resistant material, such as a silicone-based material, to facilitate ease of handling by the user after a cooking process. In some embodiments, moreover, different materials may be used to form any one or more of the flat cooking surface 200, grease chute 300, outer lip 500, and/or handles 700 on the griddle 100. In some embodiments, a non-stick coating or treatment may be applied to at least the flat cooking surface 200.

In the embodiment of FIG. 1, the flat cooking surface 200 comprises a majority of the top surface of the griddle 100. A user may cook food items directly on the flat cooking surface 200 similar to how a user cooks food on the surface of a griddle in indoor kitchens. The flat cooking surface 200 comprises at least one edge that is adjacent to the grease chute 300. The grease chute 300 comprises a recessed region of the griddle 100 that forms a receptacle for removing grease and food waste from the flat cooking surface 200. For example, when cooking on the flat cooking surface 200, a user can drag grease, food waste, liquids, and any other debris over an edge of the flat cooking surface 200 and into the grease chute 300, where such materials can fall (or flow) through at least one hole 400 to be burned off by the combusting fuel below. While the grease chute 300 is located toward the front of the exemplary griddle 100 in FIG. 1, in alternative embodiments it may be located elsewhere on the griddle, for example, as any recessed region within or adjacent to the flat cooking surface 200.

The grease chute 300 is preferably configured to direct grease, food waste, liquids, and debris towards at least one hole 400 located towards the bottom of the grease chute 300 through which such grease and waste can exit the griddle. For example, in FIG. 1 the grease chute 300 comprises one or more angled side walls 310 and 320 configured to guide the grease, food waste, liquids, and debris toward the hole 400. In this exemplary embodiment, the side wall 310 located closest to the flat cooking surface 200 may be formed of one or more surfaces having different angles than the one or more surfaces on the opposing side wall 320. For example, as FIGS. 1, 2, and 3A-3B show, a surface of the side wall 310 may be more perpendicularly oriented relative to the flat cooking surface 200 relative to an angle of the opposing side wall 320. Those skilled in the art will appreciate that other configurations for the interior surfaces of the grease chute 300 are possible, including curved surfaces, provided that at least some of the interior surfaces, such as one or more of the side walls 310 and 320 (or portions thereof), are configured to direct grease and food waste toward the hole 400 of the grease chute 300.

In the exemplary griddle 100 of FIGS. 1-6, the grease chute 300 comprises a single hole 400 formed as an oval or oblong-shaped opening at or near the bottom of the grease chute. However, those skilled in the art will appreciate that the single hole 400 in the exemplary embodiments alternatively may be implemented using any number of one or more openings having any desired shapes and sizes. For example, the hole 400 in the grease chute 300 could be replaced with multiple openings located at or near the bottom of the grease chute and/or along its side walls 310 and 320 without any loss of generality.

The griddle 100 comprises an outer lip 500 that extends upwardly away from the flat cooking surface 200. The outer lip 500 may provide a barrier to prevent grease or food from falling over any outer edges of the flat cooking surface 200 that are not adjacent to the grease chute 300. As FIGS. 1, 2, and 3A-3B show, the outer lip 500 preferably extends substantially perpendicularly relative to the flat cooking surface 200 and preferably extends around the entire boundary of the griddle 100. In other embodiments, however, the outer lip 500 may extend around only outer boundaries of the flat cooking surface 200 or one or more portions thereof.

Figure 3A:
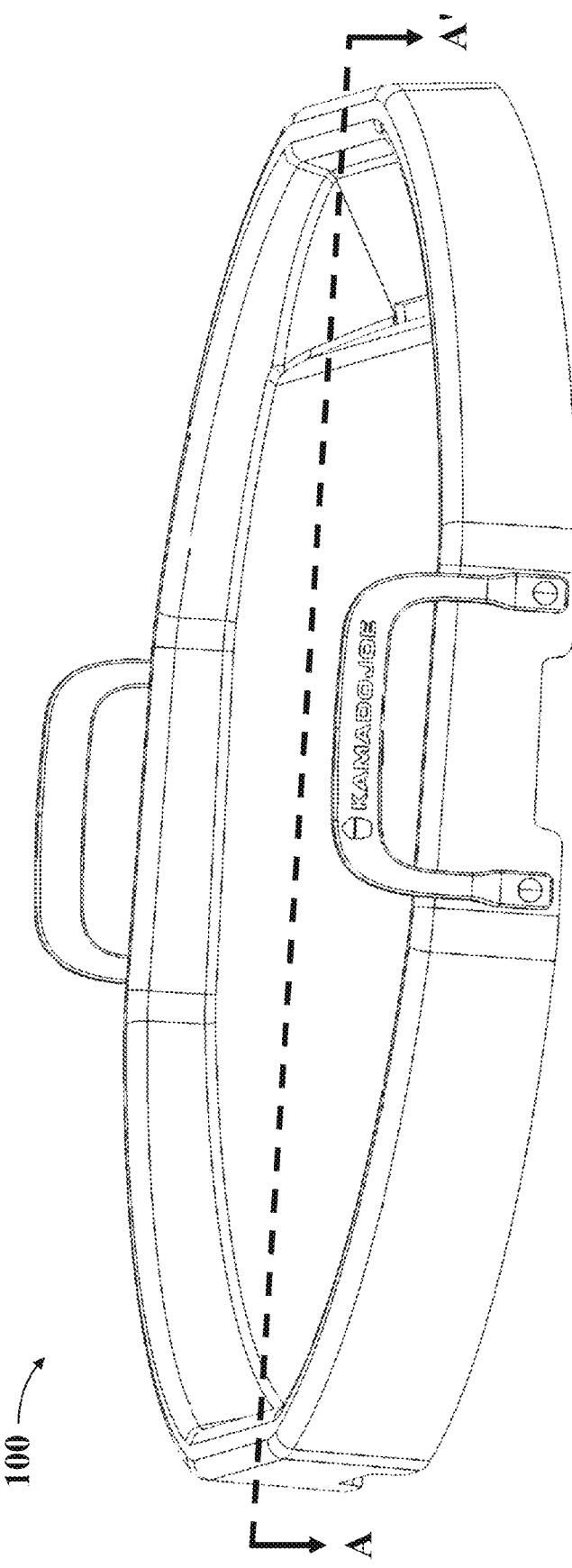
FIG. 3A is a top, left-side perspective view of the exemplary griddle of FIG. 1 illustrating a line A-A' through which the cross-sectional view in FIG. 3B may be created.
Figure 3B:
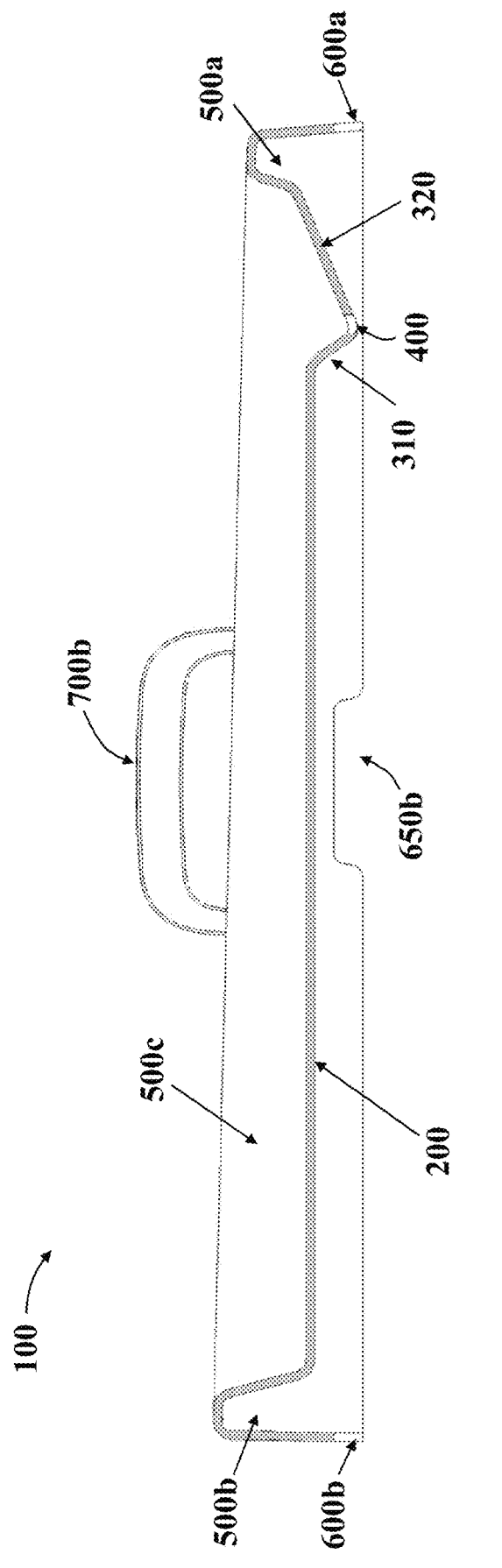
FIG. 3B is a left-side cross-sectional view of the exemplary griddle of FIG. 1 created by passing a vertical plane through the line A-A' in FIG. 3A.

FIG. 3A illustrates a top, left-side perspective view of the exemplary griddle 100 including a dotted line A-A' through which a cross-sectional view in FIG. 3B may be created by passing a vertical plane through the dotted line. As the cross-sectional view in FIG. 3B shows, the vertical height of the outer lip 500 may vary, for example, such that the height of the outer lip 500a at or near the front of the griddle 100 may be relatively lower than the height of the outer lip 500b at or near the back of the griddle or along its sides 500c. In other embodiments (not shown), the vertical height of the outer lip 500 may be approximately the same around the periphery of the griddle 100.

Figure 2:
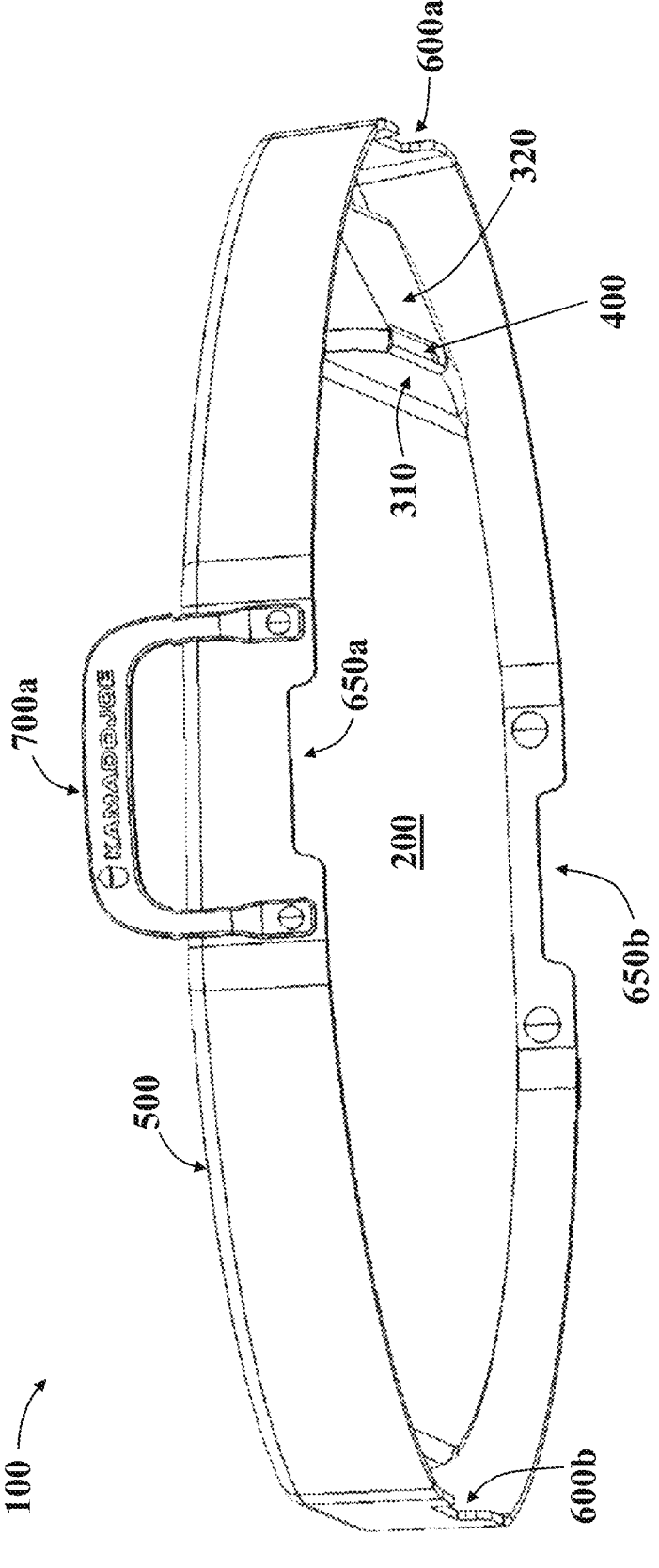
FIG. 2 is a bottom, left-side perspective view of the exemplary griddle of FIG. 1 in accordance with certain embodiments of the present invention.
Figure 5:
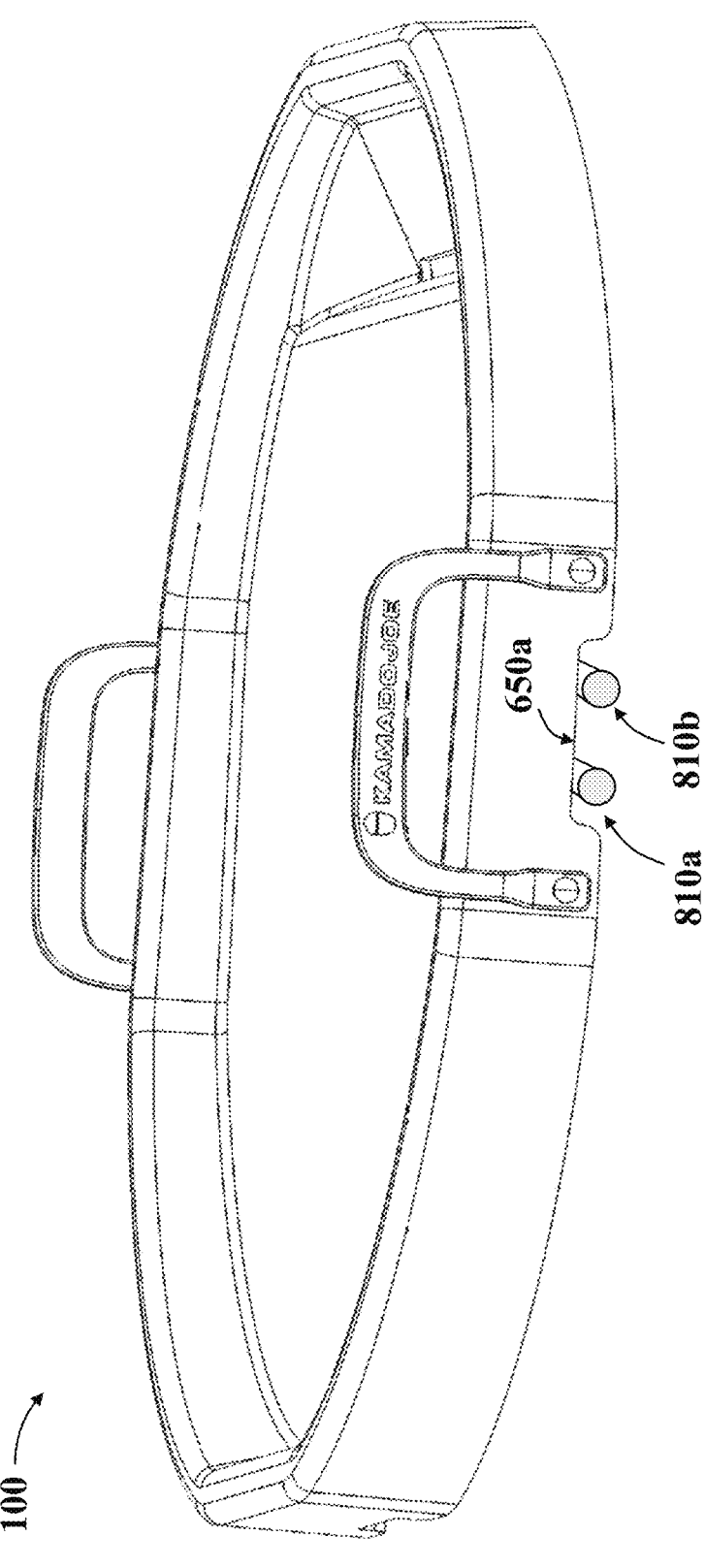
FIG. 5 is top, left-side perspective view of the exemplary griddle of FIG. 1 in which an exemplary notch in a bottom surface of the outer lip of the griddle may be positioned over one or more bars of a cooking grate in accordance with certain embodiments of the present invention.

FIGS. 2 and 3B also illustrate that the outer lip 500 may extend vertically below the flat cooking surface 200 and grease chute 300. As such, the bottom sides of the flat cooking surface 200 and the grease chute 300 may not directly contact the cooking grate of the kamado-style grill when the griddle 100 is positioned on the cooking grate (FIGS. 4, 5, and 6).

The griddle 100 may comprise one or more notches 600 and/or 650 for coupling the griddle to the cooking grate disposed below the griddle. In FIGS. 1, 2, and 3A-3B, for example, the griddle 100 comprises notches 600a and 600b respectively located at the front and back of the griddle, and further comprises notches 650a and 650b respectively located on the left and right sides of the griddle. In this exemplary embodiment, the notches 600a,b and 650a,b may be disposed within a bottom side of the outer lip 500. In other embodiments (not shown), one or more notches may extend along at least a portion of a bottom surface of the griddle 100 and/or outer lip 500. Further, while the exemplary griddle 100 comprises four notches 600a,b and 650a,b, those skilled in the art will appreciate that other possible embodiments may employ one or more notches or even no notches at all.

For those embodiments of the griddle 100 that include notches 600 and/or 650 (such as in FIGS. 1, 2, and 3A-3B), the notches may provide stability and help secure the griddle 100 when it is placed over a cooking grate of a kamado-style grill. For example, FIG. 4 illustrates a cooking grate 800 having a set of metal bars 810, which may be arranged in parallel and/or in a grid pattern. The griddle 100 may be used with various cooking grates, with different sizes and patterns of metal bars, and the cooking grate 800 in FIG. 4 is merely exemplary. In some embodiments of the griddle 100, each notch 600 or 650 may be sized and spaced to fit over one or more bars 810 of the cooking grate 800. FIG. 5, for example, illustrates the griddle 100 positioned on the cooking grate 800 with the griddle's left-side notch 650a positioned over a pair of metal bars 810a and 810b. In this exemplary configuration, the metal bars 810a and 810b may limit the amount of lateral movement of the griddle 100 (in this case front-to-back movement) while the griddle is positioned on the cooking grate 800.

In other embodiments, such as described below with reference to FIG. 6, at least one notch 600 or 650 of the griddle 100 may be sized and shaped to engage with a corresponding structural element on the cooking grate and/ or kamado-style grill to help secure the griddle when it is placed over the cooking grate. In general, the size and position of the notches 600 and 650 on the griddle 100 preferably matches the dimensions of the cooking grate and/or its pattern of bars, or matches the size and shape of any other structural element(s) that may engage with the notches to secure the griddle in the kamado-style grill.

FIG. 6 illustrates an exemplary embodiment of a kamado-style grill 900 in which the exemplary griddle 100 has been positioned on a top cooking grate of the grill. The kamado-style grill 900 comprises a domed top cover 910 connected to a lower base 920 by a hinge 930. The lower base 920 is seated within a support structure 940, such as a cart, and includes a pair of shelves 950*a* and 950*b* attached at either side. The domed top cover 910 is in an open position showing the griddle 100 positioned on the cooking grate of the kamado-style grill 900. As FIG. 6 shows, the exemplary griddle 100 may be sized and shaped to fit snuggly within the kamado-style grill 900 and rest atop its cooking grate.

Further, in this embodiment, the notches 600*a,b* and 650*a,b* on the griddle 100 may be sized and shaped to fit over respective structures 960 that extend upwardly from the cooking grate and, when engaged with their corresponding notches 600*a,b* and 650*a,b*, help prevent movement of the griddle 100 while it is positioned on the cooking grate. In this example, each structure 960 may be generally U-shaped and configured to fit within a respective notch 600 and 650. In some embodiments, the structures 960 may be aligned with respective notches 600 and 650 and configured to apply a pressure fit against an outer surface of the outer lip 500 when the griddle 100 is positioned on the cooking grate. Persons skilled in the art will understand that other locking and/or securing mechanisms are also possible for securing the griddle 100 to the cooking grate. For example, in alternative embodiments, the bottom surface of the outer lip 500 may comprise one or more holes (not shown) that may engage with corresponding posts extending from the cooking grate to secure the position of the griddle on the cooking grate.

Those skilled in the art will also appreciate that other modifications and alternatives may be implemented in accordance with the exemplary embodiments described herein. For instance, while the disclosed embodiments describe an exemplary griddle 100 that may be used with a kamado-style grill, it will be apparent to those skilled in the art that the griddle 100 may be adapted for use with other types of barbecue grills and smokers.

While this invention has been described with reference to preferred embodiments thereof, it is to be understood that variations and modifications can be affected within the spirit and scope of the invention as described herein and as described in the appended claims. Accordingly, this description is to be taken only by way of example and not to otherwise limit the scope of the exemplary disclosed embodiments herein. Therefore, it is the object of the appended claims to cover all such variations and modifications as come within the true spirit and scope of the embodiments disclosed herein.

We claim:

1. A removable accessory for a kamado-style grill, the kamado-style grill comprising a cooking grate, and the removable accessory comprising:

a flat cooking surface for supporting food items to be cooked in the kamado-style grill;

a receptacle comprising a recessed region in the removable accessory for removing grease from the flat cooking surface, the receptacle having at least one hole through which grease in the receptacle exits the recessed region, the recessed region of the receptacle being formed adjacent to the flat cooking surface;

an outer lip comprising a top side that extends upwardly away from the flat cooking surface to prevent grease or food from falling over outer boundaries of the flat cooking surface and a bottom side that extends downwardly away from the flat cooking surface, wherein the bottom side of the outer lip; and one or more notches configured to removably couple the removable accessory to a structure within the kamado-style grill, wherein each of the one or more notches comprise a cut-out within the bottom side of the outer lip that comprises a size, a shape, and spacing such that the cut-out is configured to fit over and engage with the structure to provide stability and secure the griddle within an interior of the kamado-style grill;

wherein the removable accessory is configured to be positioned on the cooking grate in the kamado-style grill and a shape of the removable accessory corresponds to a cross-sectional shape of the interior of the kamado-style grill.

2. The removable accessory of claim 1, wherein the receptacle comprises one or more sloped side walls configured to direct the grease toward the at least one hole.

3. The removable accessory of claim 1, wherein an integrated structure in the removable accessory comprises both the flat cooking surface and the receptacle.

4. The removable accessory of claim 1, further comprising one or more handles for positioning and removing the removable accessory on the cooking grate.

5. The removable accessory of claim 1, wherein the removable accessory is substantially circular shaped.

6. The griddle of claim 1, wherein the recessed region comprises a first side wall extending downwardly from the flat cooking surface towards the at least one hole and a second side wall positioned on an opposite side of the at least one hole from the first side wall and wherein the second side is composed of two or more sloped surfaces.

7. The griddle of claim 6, wherein at least one of the two or more sloped surfaces of the second side wall is sloped at a different angle from the first side wall.

* * * * *